United States Patent
Meffert et al.

(10) Patent No.: US 6,552,142 B1
(45) Date of Patent: Apr. 22, 2003

(54) PROCESS FOR PREPARING AQUEOUS DISPERSIONS OF COPOLYMERS FROM HYDROPHILIC AND HYDROPHILIC MONOMERS, COPOLYMERS OBTAINABLE THEREFROM AND USES THEREOF

(75) Inventors: Helmut Meffert, Mannheim (DE); Maximilian Angel, Schifferstadt (DE)

(73) Assignee: BASF Akeiengesellschaft, Ludwigshafen (DE)

( * ) Notice: Subject to any disclaimer, the term of this patent is extended or adjusted under 35 U.S.C. 154(b) by 0 days.

(21) Appl. No.: 09/505,708

(22) Filed: Feb. 17, 2000

(30) Foreign Application Priority Data

Feb. 25, 1999 (DE) .......................................... 199 08 184

(51) Int. Cl.$^7$ .......................... C08F 26/08; C08F 26/06; C08F 2/16
(52) U.S. Cl. ...................... 526/264; 526/258; 526/307.1
(58) Field of Search ................................. 526/258, 264, 526/307.1

(56) References Cited

U.S. PATENT DOCUMENTS

| 3,166,525 A | | 1/1965 | Perry | |
|---|---|---|---|---|
| 3,171,784 A | | 3/1965 | Witwer | |
| 3,862,915 A | * | 1/1975 | Fried | ............................ 522/79 |
| 4,644,020 A | * | 2/1987 | Stahl | ............................ 526/264 |
| 5,319,041 A | | 6/1994 | Zhong et al. | .................. 526/73 |
| 5,395,904 A | | 3/1995 | Zhong et al. | ................ 526/264 |
| 6,075,107 A | | 3/2000 | Kothrade et al. | ............ 526/264 |

FOREIGN PATENT DOCUMENTS

| EP | 867455 | 3/1997 |
|---|---|---|
| EP | 1 010 707 | 6/2000 |
| GB | 1511563 | 5/1978 |
| WO | WO 97/31041 | 8/1997 |

* cited by examiner

*Primary Examiner*—Christopher Henderson
(74) *Attorney, Agent, or Firm*—Keil & Weinkauf

(57) ABSTRACT

A description is given of a process for preparing aqueous copolymer dispersions by free-radical polymerization of ethylenically unsaturated monomers in an aqueous solution in which (a) from 10 to 90% by weight of at least one hydrophilic monomer A which has an N-vinyl group and whose polymerisation rate possesses a maximum at pH levels above 7, and (b) from 10 to 90% by weight of at least-one monoethylenically unsaturated hydrophobic monomer B whose polymerisation rate possesses a maximum at pH levels below 7, are copolymerised in the presence of a free-radical initiator system such that in the course of the polymerization the pH falls by from 2 to 5 units.

The copolymer dispersions prepared in this way and the copolymers obtainable therefrom are suitable as auxiliaries for pharmaceutical, cosmetic or agrochemical formulations and for preparing paints, coating compositions, sizes, and adhesives.

12 Claims, No Drawings

US 6,552,142 B1

PROCESS FOR PREPARING AQUEOUS DISPERSIONS OF COPOLYMERS FROM HYDROPHILIC AND HYDROPHILIC MONOMERS, COPOLYMERS OBTAINABLE THEREFROM AND USES THEREOF

BACKGROUND OF THE INVENTION

The present invention relates to a process for preparing aqueous dispersions of copolymers from hydrophilic and hydrophobic monomers. The present invention relates in particular to a process for preparing aqueous copolymer dispersions starting from monomers which exhibit different reaction behavior in different pH ranges.

In addition, the present invention relates to the aqueous copolymer dispersions prepared by the process of the invention and to their uses.

Further subjects of the present invention are the copolymers obtainable starting from these copolymer dispersions, and their uses.

It is known that for certain monomers there is an optimum pH range for homo- and/or copolymerization. For example, vinyl esters, i.e., the carboxylic esters of vinyl alcohol, such as vinyl acetate, vinyl chloroacetate or vinyl propionate, for example, refuse to undergo emulsion polymerization at a pH above 7.0. Below 7.0, the polymerization rate increases as the pH is progressively lowered. In contrast, at pH levels dropping below 7.0, aliphatic vinyl ethers increasingly undergo hydrolysis to acetaldehyde and aliphatic alcohols (F. Hölscher, Dispersionen synthetischer Hochpolymerer, Teil I: Eigenschaften, Herstellung and Prüfung, Springer Verlag, Berlin, 1969). The same applies to N-vinyllactams such as vinylpyrrolidone and vinylcaprolactam, for example.

Patent DE 1 089 930 B describes sprayable hairsetting compositions comprising a copolymer of from 90 to 25% by weight of an N-vinylpyrrolidone and from 10 to 75% by weight of a vinyl ester, e.g., vinyl acetate, and also a process for preparing these copolymers in low-boiling alcohols. According to that process, the initiator is added to monomers in the form of an initial charge in a low-boiling alcohol. The Fikentscher K values achieved in this way are relatively low, at merely from 15 to 60. The generation of high K values with this process is difficult, or even impossible, to achieve, owing to the chain transfer effect of the alcohols. In addition, there is no provision for pH control of the reaction medium during the polymerization reaction.

U.S. Pat. No. 5 319 041 discloses the copolymerization of N-vinylpyrrolidone (VP) and vinyl acetate (VAc) with a VP/VAc weight ratio of from 25 to 75% by weight/from 75 to 25% by weight in alcoholic solution. The K values achieved with this process are low, at from 25 to 40. Here again, high K values can be achieved only with great difficulty, if at all, for the reasons mentioned above and for technical reasons associated with the process.

DE-C-25 28 068 describes crosslinked, water-insoluble hydrophilic gels consisting of copolymers comprising (a) from 30 to 90% by weight of certain water-soluble monoolefins, such as polyethylene oxide alkyl acrylate, N-vinylpyrrolidone, acrylic acid, methacrylic acid or hydroxyalkyl acrylates, or of a mixture of these monomers with from 1 to 50% by weight of water-insoluble monoolefins; and (b) from 10 to 70% by weight of certain hydrophobic macromers as crosslinkers, having an average molecular weight of from 400 to 8000 g/mol. Water-insoluble monomers specified are alkyl acrylates and alkyl methacrylates, in which alkyl can have up to 18 carbon atoms; vinyl esters (e.g., vinyl acetate) derived from alkanecarboxylic acids having up to 5 carbon atoms; styrene; and alkyl vinyl ethers, in which alkyl contains up to 5 carbon atoms. The polymerization is conducted in bulk or in solution.

WO-A-97/31041 discloses a process for preparing pulverulent, nonhygroscopic, highly swellable, weakly crosslinked copolymers of vinylpyrrolidone (VP) and vinyl acetate (VAc) of high viscosity, prepared by precipitation polymerization in an organic solvent, preferably heptane, hexane or cyclohexane. The monomers are polymerized in-a VP/VAc ratio of from 90/10 to 60/40. Crosslinkers are used in amounts of from 0.1 to 2% by weight, based on monomers. The polymers described can be used in pharmaceutical applications, such as in the controlled release of active principles from tablets, for example. An unfavorable aspect of this process is, in particular, the use of very highly flammable organic solvents, which are technically difficult to separate from the product.

U.S. Pat. No. 5 395 904 describes a process for preparing homogeneous copolymers from vinylpyrrolidone and vinyl acetate, forming clear aqueous solutions. For this process, the monomers are introduced as initial charge in a defined proportion and are supplied separately to the reaction medium over a time which is a function of their reactivity. The solvent used is either alcohol or a water-alcohol mixture containing up to 50% by weight of water. The polymers obtained in this way have low K values of between 10 and 40. High molecular weights are impossible to obtain owing to the use of the regulating alcohols. Likewise, there is no provision for pH regulation in order to control the K value.

U.S. Pat. No. 3 166 525 mentions a process for copolymerizing N-vinylpyrrolidone and vinyl esters of acids and fatty acids in water, in which the entire monomer amount is introduced initially in the reaction solution. The K values of the polymers obtained in this way, although they are higher (up to 55) than those of polymers prepared in the same way in organic solvents, are nevertheless still too low for.certain applications. Fikentscher K values above 55 are not obtained with this process. Careful control of pH change over the entire reaction period with the aim of achieving higher K values is not mentioned.

Finally, DE-A-197 12 247 describes a process for the free-radical 20 aqueous emulsion polymerization of water-soluble monomers containing N-vinyl groups, such as, for example, N-vinylpyrrolidone with hydrophobic monomers such as, for example, vinyl acetate. A disadvantage of this process is the relatively high residual level of vinylpyrrolidone monomer, which generally in the examples is markedly above 50 ppm and can attain levels of up to 2000 ppm of N-vinylpyrrolidone (Examples 13 and 14). Fikentscher K values of more than 100 are likewise not achieved with this process. Careful control of pH change over the entire reaction period is, again, not envisaged here. Instead, the pH is to be kept constant over the duration of the reaction.

BRIEF SUMMARY OF THE INVENTION

It is an object of the present invention to provide a process for preparing aqueous dispersions of high molecular mass copolymers from hydrophilic and hydrophobic monomers having different reaction behavior in different pH ranges. The products obtained are intended to have a low residual monomer content and high Fikentscher K values.

We have found that this object is achieved by conducting the polymerization as a free-radical polymerization in aqueous solution using a water-soluble initiator system and controlling the pH of the reaction medium such that it is reduced during the reaction.

The present invention accordingly provides a process for preparing an aqueous copolymer dispersion by free-radical polymerization of ethylenically unsaturated monomers in an aqueous medium comprising (a) from 10 to 90% by weight of at least one preferably nonionic, hydrophilic, nitrogen-containing monomer A which has an N-vinyl group and whose polymerization rate possesses a maximum at pH levels above 7;

(b) from 10 to 90% by weight of at least one monoethylenically unsaturated hydrophobic monomer B whose polymerization rate possesses a maximum at pH levels below 7;

(c) from 0.01 to 20% by weight, based on the total monomers present in the reaction medium, of at least one water-soluble or water-insoluble free-radical initiator or of a mixture of water-soluble with water-insoluble free-radical initiators, the pH being controlled in the course of the polymerization reaction in such a way that in the course of the polymerization it decreases by from 2 to 5 units between start and finish of the reaction. The residual monomer content in the resulting copolymer dispersion after the polymerization reaction has been ended is not more than 50 ppm.

In accordance with the invention, the polymerization reaction is conducted, or controlled, in such a way that the pH decrease in the course of the polymerization, i.e., between start and finish of the reaction, is from 2 to 5 pH units, preferably from 2.5 to 4.5 pH units, in particular from 3 to 4 pH units. The pH reduction therefore takes place during the polymerization rather than subsequently, after the end of polymerization (the end of polymerization here means a degree of conversion of at least 90% of the monomers used).

In general, the pH of the reaction medium at the beginning of the polymerization reaction lies within the range from 6 to 10, preferably from 7 to 9, in particular from 7 to 8.

At the end of the polymerization reaction, the pH generally lies within the range from 2 to 6.5, preferably from 3 to 5, in particular from 4 to 5.

The reduction in pH can be effected by adding suitable bases, acids and/or buffer systems. By this means it is generally possible to carry out careful control of the pH.

The addition, metered or otherwise, of suitable base(s), acid(s) and/or buffer system(s) can be made continuously, batchwise, in stages, as a gradient, or in any other way possible. This addition is generally made prior to and/or during the polymerization reaction; in other words, to control the pH of the reaction medium it is possible to include the base(s), acid(s) and/or buffer system(s) in the initial charge, in the reaction medium, and/or to meter it (them) in during the polymerization. For example, the acid(s) and/or base(s) or the buffer system can be added continuously during the addition of the monomers, or else in stages (in two or more portions) or in a single portion.

In order that the pH at the beginning of the polymerization does not fall suddenly to the desired final level, which would correspond to an unwanted course of the polymerization, suitable bases are added to the polymerization medium. This addition can be made continuously, batchwise, as a gradient, or in stages.

Bases (alkalis) suitable in accordance with the invention are especially alkali metal hydroxides, such as NaOH or KOH, alkaline earth metal hydroxides, or ammonia.

In one preferred embodiment of the process of the invention, sodium hydroxide solution or potassium hydroxide solution or an ammonia solution is added as alkaline component or base to the reaction medium prior to and/or during the polymerization. Particularly suitable are dilute solutions having a base content of, in particular, from 1 to 20% by weight. Equally suitable are basic buffer systems such as, for example, potassium hydrogen phosphate, disodium hydrogen phosphate, sodium tetraborate/HCl, sodium tetraborate/NaOH, glycine/NaOH, etc.

If the pH does not fall to the desired final pH during the course of the polymerization, then suitable acids can be added to the polymerization medium. This addition can be made continuously, batchwise, as a gradient, or in stages.

Acids suitable in accordance with the invention are, in particular, mineral acids, such as hydrochloric acid, sulfuric acid, or organic acids, examples being organic sulfonic acids such as para-toluenesulfonic acid.

In one preferred embodiment, acidic and/or proton donating polymerization initiators are used in the course of the polymerization, and act simultaneously as initiators and as acid component. Further details of this are given below in connection with the polymerization initiators.

In order to control the pH is it also possible to use suitable buffer systems. These are included in the initial charge in the reaction medium and/or metered in during the polymerization. Examples of suitable buffer systems are ammonium bicarbonate buffer, hydrogen phosphate buffer, borate buffer, acetate buffer, citrate buffer, succinate buffer, glycinate buffer or phthalate buffer.

The hydrophilic monomers A which have an N-vinyl group and whose polymerization rate possesses a maximum at pH levels above 7 are preferably selected from (i) N-vinyllactams, especially those of 5 to 7 carbon atoms (e.g., N-vinylpyrrolidone, N-vinylpiperidone and N-vinylcaprolactam); (ii) acyclic N-vinylcarboxamides, especially those of 3 to 6 carbon atoms (e.g., N-vinylformamide and N-methyl-N-vinylacetamide); and (iii) N-vinylimidazoles and quaternized derivatives thereof (e.g., N-vinylimidazole).

The monomer or monomers A is or are used in amounts of from 10 to 90%, by weight, preferably in amounts of from 15 to 70% by weight, in particular in amounts of from 20 to 50% by weight, based in each case on the total monomer amount.

Compounds suitable in accordance with the invention as monoethylenically unsaturated hydrophobic monomers B whose polymerization rate possesses a maximum at pH levels below 7 are all those which can be metered into the reaction medium in such a way that they are still soluble in the reaction medium.

The monomers B are preferably selected from esters of monoethylenically unsaturated carboxylic acids, especially from $C_1$–$C_{10}$ alkyl esters of monoethylenically unsaturated $C_3$–$C_6$ carboxylic acids and $C_4$–$C_8$ dicarboxylic acids, such as acrylic acid, methacrylic acid, crotonic acid, 2-ethylpropenoic acid, itaconic acid, maleic acid, citraconic acid, and fumaric acid. Particular preference is given to the esters of acrylic acid and of methacrylic acid with $C_1$–$C_8$ alkanols, such as, for example, methyl methacrylate, ethyl acrylate, n-butyl acrylate and 2-ethylhexyl acrylate. Likewise suitable are the monoesters of the abovementioned, monoethylenically unsaturated dicarboxylic acids with $C_1$–$C_8$ alkanols.

Suitability as monomer B also extends to vinylaromatic compounds, such as styrene.

Particularly suitable monomers B also include the vinyl esters of $C_1$–$C_{22}$ carboxylic acids, preferably vinyl acetate, and vinyl propionate.

The monomer or monomers B is or are used in amounts of from 10 to 90% by weight, preferably in amounts of from 85 to 30% by weight, in particular in amounts of from 80 to 50% by weight, based in each case on the total monomer amount.

In the process of the invention, the reaction mixture to be copolymerized can if desired include from 0.1 to 20% by weight, preferably from 0.5 to 10% by weight, in particular from 0.5 to 8% by weight, of at least one further monoethylenically unsaturated monomer C.

Suitable monomers C in accordance with the invention are neutral, water-soluble monomers, especially the following compounds:

i) ethylenically unsaturated $C_3$–$C_6$ monocarboxylic acids and $C_4$–$C_8$ dicarboxylic acids, such as acrylic acid, methacrylic acid, crotonic acid, itaconic acid, maleic acid, citraconic acid, and fumaric acid;

ii) ethylenically unsaturated sulfonic acids and phosphonic acids, such as vinylsulfonic acid, styrenesulfonic acid, 2-acrylamido-3-methylpropanesulfonic acid, and vinylphosphonic acid;

iii) acrylamide, methacrylamide, and the N-mono-$C_1$–$C_4$-alkyl- and N,N-di-$C_1$–$C_4$-alkyl derivatives thereof; and iv) hydroxy-$C_1$–$C_6$-alkyl esters and monoesters of the $C_3$–$C_6$ mono- and $C_4$–$C_8$ dicarboxylic acids mentioned under i).

The copolymer dispersions of the invention may further be prepared using what are known as crosslinking monomers D. These are ethylenically diunsaturated, nonconjugated monomers, in particular the diesters or polyesters of dihydric or more highly functional alcohols with ethylenically unsaturated $C_3$–$C_6$ carboxylic acids. Examples of compounds of this kind are alkylene glycol diacrylates and dimethacrylates, such as ethylene glycol di(meth)acrylate, 1,3- or 1,4-butylene glycol di(meth)acrylate, diethylene glycol di(meth)acrylate, 1,6-hexanediol di(meth)acrylate, neopentyl glycol di(meth)acrylate, triethylene glycol di(meth)acrylate, tetraethylene glycol di(meth)acrylate, 1,12-dodecanediol di(meth)acrylate, polyethylene glycol di(meth)acrylate, 2,2-bis(p-(meth)acryloxyphenyl)propane, tripropylene glycol di(meth)acrylate, trimethylolpropane tri(meth)acrylate, pentaerythritol tri(meth)acrylate or pentaerythritol tetra(meth)acrylate. Further suitable monomers D are the vinyl, allyl and methallyl esters of ethylenically unsaturated $C_3$–$C_6$ carboxylic acids, such as vinyl (meth)acrylate, allyl (meth)acrylate and methallyl (meth)acrylate, the vinyl, allyl and methallyl esters of aliphatic or aromatic dicarboxylic acids, such as divinyl phthalate or diallyl phthalate, divinylethyleneurea, and divinylaromatic compounds, such as divinylbenzene. They can be used in amounts of from 0.1 to 10% by weight, preferably from 0.5 to 5% by weight, in particular from 0.5 to 2% by weight, based in each case on the total monomer amount.

The polymerization is generally conducted in the presence of at least one free-radical initiator. The amount of free-radical initiator(s), based on the total monomer amount, is generally from 0.01 to 20% by weight, preferably from 0.1 to 10% by weight, in particular from 0.5 to 5% by weight.

The initiator used comprises water-soluble or water-insoluble free-radical initiators or else mixtures of water-soluble with water-insoluble free-radical initiators.

Initiators used can thus be both peroxides, e.g., alkali metal peroxodisulfates, and hydroperoxides, and also azo compounds, such as those specified below.

Particularly suitable free-radical polymerization initiators are all those which are able to trigger a free-radical aqueous emulsion polymerization.

Preference is given to those water-soluble initiators whose solubility in water is such that the entirety of the amount of initiator used is present in solution in the respective reaction medium. Preferred polymerization initiators include water-soluble azo compounds such as 2,2'-azobis(2-(2-imidazolin-2-yl))propane, 2,2'-azobis(2-amidinopropane) and the acid addition salts thereof, especially the hydrochlorides, acetates or (hydrogen) sulfates thereof, 4,4'-azobis(4-cyanovaleric acid) and its alkali metal or ammonium salts, especially its sodium salts, or 2-(carbamoylazo)isobutyronitrile.

Use is also made of combined systems composed of at least one organic reducing agent and at least one peroxide and/or hydroperoxide, an example being tert-butyl hydroperoxide with the sodium salt of hydroxymethanesulfinic acid, or else hydrogen peroxide with ascorbic acid. In addition, combined systems are used which include a small amount of a metal compound which is soluble in the polymerization medium and whose metallic component is able to occur in a plurality of valence states, an example being ascorbic acid/iron(II) sulfate/hydrogen peroxide, in which case the ascorbic acid can also frequently be replaced by the sodium salt of hydroxymethanesulfinic acid, sodium sulfite, sodium hydrogen sulfite or sodium bisulfite, and the hydrogen peroxide by tert-butyl hydroperoxide or alkali metal peroxodisulfates and/or ammonium peroxodisulfate.

Preferred initiators are the ammonium salts or alkali metal salts of peroxosulfates or peroxodisulfates, especially sodium or potassium peroxodisulfate.

In one particularly preferred embodiment, acidic and/or proton donating polymerization initiators are used in the course of the polymerization, and serve simultaneously to control the pH. One particular example that may be mentioned of an acidic polymerization initiator is 2,2'-azobis(2-amidinopropane) dihydrochloride. Examples of proton donating polymerization initiators are especially peroxides and hydroperoxides, such as tert-butyl hydroperoxide, tert-amyl hydroperoxide, cumene hydroperoxide, pinane hydroperoxide, peroxodisulfuric acid and its salts, especially its alkali metal or ammonium salts, and hydrogen peroxide. As described above, these peroxides and hydroperoxides can be used either alone or, preferably, together with a reducing agent, such as with a salt of hydroxymethanesulfinic acid or ascorbic acid or a transition metal compound whose transition metal compound is able to exist in different oxidation states in aqueous solution, examples being iron(II) salts or copper(II) salts (such systems being referred to as redox initiator systems).

The polymerization can also be initiated by high-energy radiation, such as y radiation, or can be conducted as a photopolymerization, i.e., by initiation with visible or UV light in the presence of suitable photbinitiators. Suitable photoinitiators include, in particular, derivatives of acetophenone, of benzophenone or of thioxanthone.

The reaction medium used for the copolymerization is water. The reaction medium may additionally include one or more $C_1$–$C_4$ alcohols, such as methanol, ethanol, n-propanol, n-butanol or isobutanol, in amounts of from 0.1 to 20% by weight, preferably from 1 to 10% by weight, in particular from 1 to 5% by weight.

Particular preference is given to the use of water as the sole reaction medium.

The copolymers are prepared by the method of aqueous solution or emulsion polymerization in accordance with a batch process or, preferably, with a feed process.

The monomers to be copolymerized can be included in the initial charge in the aqueous reaction medium (batch process).

Preferably, however, the polymerization takes place in accordance with a feed process. For the purposes of the invention, a feed process means that only a small portion of the monomers to be copolymerized is included in the initial charge to the reaction vessel and the major portion, preferably at least 80% by weight, with particular preference at least 90% by weight, in particular at least 95% by weight, of the monomers to be copolymerized is metered into the polymerization batch, in the form if desired of an aqueous or aqueous-alcoholic solution or in the form of an aqueous emulsion, said metered addition to the polymerization reaction taking place either continuously, at a constant or increasing feed rate, or in stages.

The manner in which the initiator is added to the polymerization is not critical. The initiator can either be included in its entirety in the initial charge to the polymerization vessel or else can be added continuously or in stages in the course of the emulsion polymerization, at the rate at which it is consumed. The procedure adopted depends on both the chemical nature of the initiator and the polymerization temperature and can be chosen by the skilled worker depending on requirements. Preferably, the initiator is added continuously and in parallel with the addition of the monomers.

The polymerization reaction is preferably started by adding at least some of the initiator to the reaction vessel, which is at reaction temperature. In this case, the reaction vessel may include not only water but also an initial polymer, emulsifier and, if desired, a portion of the monomers. Preferably, however, the initial charge is free from monomers. It is likewise possible to include at least some of the initiator in the initial charge to the reaction vessel, together with water, a portion of the emulsifier, if desired, and an initial polymer if desired; to heat the initial charge to reaction temperature; and, subsequently, to add the monomers.

With very particular preference, portions of the monomers and of the initiator are included in the initial charge in the aqueous or aqueous-alcoholic reaction medium and are brought to reaction temperature.

The monomers are generally added over a period from 0.5 to 14 hours, preferably over from 1 to 12 hours, in particular over from 2 to 10 hours. The addition of the initiator extends over the same or a longer period.

It is customary to operate at temperatures between room temperature and 100° C., preferably at temperatures from 50 to 95° C., in particular at temperatures from 60 to 90° C. However, the reaction temperature can also be up to 130° C.

The reaction can be carried out under atmospheric pressure or, when using relatively high temperatures, under the autogenous vapor pressure or under the overpressure of an inert gas. Nitrogen is particularly suitable as the inert gas. The use of elevated or reduced pressure is likewise possible, and so the polymerization temperature may also exceed 100° C. and can be up to 130° C. Preferably, highly volatile monomers are polymerized under elevated pressure.

In order to stabilize the dispersions, the process of the invention is conducted if desired using interface- or surface-active substances, i.e., emulsifiers and/or protective colloids. These must be suitable for the implementation of the emulsion polymerization. They comprise the emulsifiers and/or protective colloids typically used for these purposes. In one embodiment of the present invention, the use of soap-forming carboxylic acids, such as resin acids, is avoided. The interface-active substances are typically used in amounts of up to 5% by weight, preferably from 0.2 to 3% by weight, in particular from 0.5 to 2% by weight, based on the monomers to be copolymerized.

Examples of suitable protective colloids are polyvinyl alcohols, polysaccharides such as starches, starch derivatives or cellulose derivatives, or vinylpyrrolidone copolymers. An exhaustive description of further suitable protective colloids is given in Houben-Weyl, Methoden der organischen Chemie, Volume XIV/1, Makromolekulare Stoffe [Macromolecular Substances], Georg-Thieme-Verlag, Stuttgart, 1961, pp. 411–420. Mixtures of emulsifiers and/or protective colloids can also be used. As the interface-active substances it is preferred to use emulsifiers, whose relative molecular weights, unlike those of the protective colloids, are usually below 2000 daltons. They can be anionic, cationic or else nonionic in nature.

Nonionic emulsifiers which can be used include araliphatic or aliphatic nonionic emulsifiers, examples being ethoxylated mono-, di- and trialkyl phenols (EO units: 3 to 50, alkyl: $C_4$–$C_{10}$), ethoxylates of long-chain alcohols (EO units: 3 to 50, alkyl: $C_8$–$C_{36}$), and polyethylene oxide/polypropylene oxide block copolymers. Preference is given to ethoxylates of long-chain alkanols (alkyl: $C_{10}$–$C_{22}$, average degree of ethoxylation: 10 to 50) and, of these, particular preference is given to those having a linear $C_{12}$–$C_{18}$ alkyl radical and an average degree of ethoxylation of from 10 to 50, and also ethoxylated monoalkylphenols.

Examples of suitable anionic emulsifiers are alkali metal salts and ammonium salts of alkyl sulfates (alkyl: $C_8$–$C_{12}$), of sulfuric monoesters with ethoxylated alkanols (EO units: 2 to 50, alkyl: $C_{12}$–$C_{18}$) and with ethoxylated alkylphenols (EO units: 3 to 50, alkyl: $C_4$–$C_9$), of alkylsulfonic acids (alkyl: $C_{12}$–$C_{18}$) and of alkylarylsulfonic aids (alkyl: $C_9$–$C_{18}$). Other suitable emulsifiers are given in Houben-Weyl, Methoden der Organischen Chemie, Volume XIV/1, Makromolekulare Stoffe [Macromolecular Substances], Georg-Thieme-Verlag, Stuttgart, 1961, pp. 192–2.08. Likewise suitable as anionic emulsifiers are bis(phenylsulfonic acid) ethers and their alkali metal or ammonium salts which carry a $C_4$–$C_{24}$ alkyl group on one or both aromatic rings. These compounds are widely known, for example, from U.S. Pat. No. 4 269 749 and are obtainable commercially, as Dowfax® 2A1 (trademark of Dow Chemical Company) for example.

Suitable cationic emulsifiers are preferably quaternary ammonium halides, e.g., trimethylcetylammonium chloride, methyltrioctylammonium chloride, benzyltriethylammonium chloride or quaternary compounds of N-$C_6$–$C_{20}$ alkylpyridines, -morpholines or -imidazoles, e.g., N-laurylpyridinium chloride.

The polymerization proper is preferably followed by what is known as a postpolymerization in order to complete the monomer conversion. This means that, following the addition of the monomers and the polymerization initiator, further free-radical initiators are supplied to the polymerization batch or to the reaction medium and, if desired, the temperature of the reaction mixture is increased to temperatures above the actual polymerization temperature.

Suitable initiators for the postpolymerization are the abovementioned initiators and also percarbonates or peroxo esters.

The aforementioned peroxides and hydroperoxides are preferably used together with a reducing agent and/or a transition metal, as described previously.

Postpolymerization generally follows directly or within a period of up to 4 hours following the completion of the last addition of monomers and initiator.

The initiator required for the postpolymerization can be added all at once or over a period of up to 10 hours. For the postpolymerization it is also possible to add two or more initiators.

Following the polymerization and, if desired, instead of a postpolymerization, the dispersions obtained can be subjected to a physical aftertreatment, examples being steam distillation or stripping with an inert gas, such as nitrogen. This removes from the dispersion steam-volatile impurities, such as residual monomers, for example.

The process of the invention results in aqueous copolymer dispersions whose residual monomer content is not more than 50 ppm, preferably not more than 30 ppm, in particular not more than 20 ppm.

The present invention therefore also provides the aqueous copolymer dispersions preparable by the process of the invention and also the copolymers obtainable therefrom by removing the reaction medium, by drying, for example (e.g., by means of spray drying, freeze drying or roller drying).

The copolymers obtainable by the polymerization process of the invention generally have very high molecular weights, which can be expressed by the Fikentscher K values (Cellulosechemie, 13, (1932) p. 60). The values of K are at least about 40, preferably at least about 80, in particular at least about 100 (1% strength in ethanol or 1:1 ethanol/water). The upper K value limit is generally 250, in particular 200, and with particular preference 180.

If lower molecular weights are required, they can be established by adding a regulator to the polymerization batch.

Particularly suitable regulators are the following compounds: aldehydes such as formaldehyde, acetaldehyde, propionaldehyde, n-butyraldehyde and isobutyraldehyde; formic acid; ammonium formate; hydroxylammonium sulfate and hydroxylammonium phosphate. It is also possible to use regulators containing organically bonded sulfur. Examples of these are di-n-butyl sulfide, di-n-octyl sulfide, diphenyl sulfide, diisopropyl disulfide, di-n-butyl disulfide, di-n-hexyl disulfide, diacetyl disulfide and di-tert-butyl trisulfide. The regulators in particular contain sulfur in the form of SH groups. Examples of regulators of this kind are n-butyl mercaptan, n-hexyl mercaptan, and dodecyl mercaptan. Also suitable are water-soluble polymerization regulators containing sulfur, such as hydrogen sulfites, disulfites and compounds such as ethyl thioglycolate, cysteine, 2-mercaptoethanol, 3-mercaptopropanol, 3-mercaptopropane-1,2-diol, mercaptoacetic acid, 3-mercaptopropionic acid, mercaptosuccinic acid, thioglycerol, diethanol sulfide, thiodiglycol, ethylthioethanol, thiourea and dimethyl sulfoxide. Further suitable regulators are allyl compounds such as allyl alcohol or allyl bromide, benzyl compounds such as benzyl bromide, or alkyl halides, such as chloroform, bromotrichloromethane or tetrachloromethane.

The regulator can, for example, be metered into the reaction batch, in the form, if desired, of a solution in water and/or a $C_1$–$C_4$ alcohol.

The aqueous copolymer dispersions preparable by the polymerization process of the invention, and the copolymers obtainable from these dispersions, find broad application in numerous technical fields. For example, they can be used as auxiliaries for pharmaceutical, cosmetic or agrochemical formulations; or alternatively, they can be used to prepare paints, coating compositions, sizes, and adhesives.

The examples which follow illustrate the invention without restricting it.

DETAILED DESCRIPTION OF THE INVENTION

WORKING EXAMPLES

EXAMPLE 1

Preparation of a Vinylpyrrolidbne-vinyl Acetate Copolymer (40% by Weight/60% by Weight)

A reaction apparatus flushed with nitrogen is charged with a mixture of 36 g of vinylpyrrolidone, 54 g of vinyl acetate and 6.7 g of an aqueous 1% strength 2,2'-azobis(2-amidinopropane) dihydrochloride solution in 1300 g of water, and this initial charge is adjusted to a pH of about 9.0 using a borate buffer solution. The mixture is subsequently heated to 70° C. This is followed by the dropwise addition via separate feeds of 124 g of vinylpyrrolidone (VP) over 8 hours, 186 g of vinyl acetate over 7 hours, and 124 g of the abovementioned initiator solution over 9 hours. For postpolymerization, 131.3 g of the abovementioned initiator solution are added at 75° C. over the course of 6 hours.

The result is a milky dispersion having a pH of 4.8. The K value is 76 (1% strength in 1:1 ethanol/water). The residual monomer content is 35 ppm of vinylpyrrolidone.

Table 1 below shows the change in pH during the polymerization.

TABLE 1

| Sample | Time [min] | pH |
| --- | --- | --- |
| 1 | 0 | 8.9 |
| 2 | 70 | 5.4 |
| 3 | 130 | 4.9 |
| 4 | 190 | 4.9 |
| 5 | 250 | 5.0 |
| 6 | 310 | 4.9 |
| 7 | 370 | 4.9 |
| 8 | 430 | 4.8 |
| 9 | 490 | 4.8 |
| 10 | 550 | 4.8 |
| 11 | 610 | 4.8 |

EXAMPLE 2

Preparation of a Vinylpyrrolidone-vinyl Acetate Copolymer (30% by Weight/70% by Weight)

A reaction apparatus flushed with nitrogen is charged with a mixture of 27 g of vinylpyrrolidone, 63 g of vinyl acetate and 6.7 g of an aqueous 1% strength 2,2'-azobis(2-amidinopropane) dihydrochloride solution in 1300 g of water, and this initial charge is adjusted to a pH of 8.6 using a 2.5% strength sodium hydroxide solution. The mixture is subsequently heated to 70° C. This is followed by the dropwise addition via separate feeds of 93 g of vinylpyrrolidone (VP) over 8 hours, 217 g of vinyl acetate over 7 hours, and 124.6 g of the abovementioned initiator solution over 9 hours. During the polymerization, the falling pH is continuously brought back to its original level using 19 g of 2.5% strength sodium hydroxide solution. For postpolymerization, 131.3 g of the abovementioned initiator solution are added at 75° C. over the course of 6 hours. The result is a milky dispersion having a pH of 4.2.

Residual monomers: 26 ppm of vinylpyrrolidone.

K value: 59 (1% strength in 1:1 ethanol/water).

Table 2 below shows the change in pH during the polymerization.

TABLE 2

| Sample | Time [min] | pH |
| --- | --- | --- |
| 1 | 0 | 8.6 |
| 2 | 60 | 4.8 |
| 3 | 120 | 4.8 |
| 4 | 180 | 4.4 |
| 5 | 240 | 4.4 |
| 6 | 270 | 4.3 |
| 7 | 375 | 4.3 |
| 8 | 480 | 4.2 |

EXAMPLE 3

Preparation of a Vinylpyrrolidone-vinyl Acetate Copolymer (30% by Weight/70% by Weight)

A reaction apparatus flushed with nitrogen is charged with a mixture of 27 g of vinylpyrrolidone, 63 g of vinyl acetate and 6.7 g of an aqueous 1% strength 2,2'-azobis(2-amidinopropane) dihydrochloride solution in 1300 g of water, and this initial charge is adjusted to a pH of 9 using a 5% strength sodium hydroxide solution. The mixture is subsequently heated to 70° C. This is followed by the dropwise addition via separate feeds of 93 g of vinylpyrrolidone over 8 hours, 217 g of vinyl acetate over 7 hours, and 124.6 g of the abovementioned initiator solution over 9 hours. During the polymerization, the falling pH is brought back to its original level using 20 g of 5% strength sodium hydroxide solution a little at a time. For postpolymerization, 131.3 g of the abovementioned initiator solution are added at 75° C. over the course of 6 hours. The result is a milky dispersion having a pH of 5.4.

K value: 216 (1% strength in ethanol).

K value: 84 (0.5% strength in acetone).

EXAMPLE 4

Preparation of a Vinylpyrrolidone-vinyl Acetate Copolymer (50% by Weight/50% by Weight)

A reaction apparatus flushed with nitrogen is charged with a mixture of 45 g of vinylpyrrolidone, 45 g of vinyl acetate and 6.7 g of an aqueous 1% strength 2,2'-azobis(2-amidinopropane) dihydrochloride solution in 1300 g of water, and this initial charge is adjusted to a pH of 9.6 using a 5% strength sodium hydroxide solution. The mixture is subsequently heated to 70° C. This is followed by the dropwise addition via separate feeds of 155 g of vinylpyrrolidone over 8 hours, 155 g of vinyl acetate over 7 hours, and 124.6 g of the abovementioned initiator solution over 9 hours. During the polymerization, the falling pH is brought back to its original level using 20 g of 5% strength sodium hydroxide solution a little at a time. For postpolymerization, 131.3 g of the abovementioned initiator solution are added at 75° C. over the course of 6 hours. The result is a milky dispersion having a pH of 4.5.

K value: 75 (0.5% strength in acetone).

Residual monomers: 22 ppm of vinylpyrrolidone.

EXAMPLE 5

Comparative Example

Preparation of a Vinylpyrrolidone-vinyl Acetate Copolymer (35% by Weight/65% by Weight) in Alcohol.

A reaction apparatus flushed with nitrogen is charged with a mixture of 31.5 g of vinylpyrrolidone and 58.5 g of vinyl acetate in 690 g of n-propanol. The mixture is subsequently heated to 75° C. This is followed by the dropwise addition via separate feeds of 108.5 g of vinylpyrrolidone over 5 hours, 201.5 g of vinyl acetate over 4 hours, and 121.6 g of tert-butyl peroxypivalate (75% strength) solution over 6 hours. For postpolymerization, 121.6 g of the abovementioned initiator solution are added at 75° C. over the course of 4 hours. After the solvent has been exchanged for water, the result is a milky dispersion.

K value: 33 (1% strength in acetone).

Residual monomers: 141 ppm of vinylpyrrolidone.

EXAMPLE 6

Comparative Examples
Polymerization Without pH Control

TABLE 3

Residual monomer content after polymerization:

| Reference | Ex. | Composition | Residual monomer content |
|---|---|---|---|
| DE-A-197 12 247: | 1 | VP/VAc 30/70 | 130 ppm VP |
| | 2 | VP/VAc 30/70 | 70 ppm VP |
| | 3 | VP/VAc 30/70 | 550 ppm VP |
| | 4 | VP/VAc 30/70 | 550 ppm VP |
| | 5 | VP/VAc 20/80 | 200 ppm VP |
| Invention: | 1 | VP/VAc 40/60 | 35 ppm VP |
| | 2 | VP/VAc 30/70 | 26 ppm VP |
| | 4 | VP/VAc 50/50 | 22 ppm VP |

EXAMPLE 7

An N-vinylformamidede-vinyl Acetate Copolymer 30% by Weight/70% by Weight

A reaction apparatus flushed with nitrogen is charged with a mixture of 27 g of vinylformamide, 63 g of vinyl acetate and 6.7 g of an aqueous 1% strength 2,2'-azobis(2-amidinopropane) dihydrochloride solution in 1300 g of water, and this initial charge is adjusted to a pH of 8.6 using a 5% strength sodium hydroxide solution. The mixture is subsequently heated to 70° C. This is followed by the dropwise addition via separate feeds of 93 g of N-vinylformamide over 8 hours, 217 g of vinyl acetate over 7 hours, and 130 g of the initiator solution over 9 hours. During the polymerization, the falling pH is continuously brought back to its original level using 20 g of 5% strength sodium hydroxide solution. For postpolymerization, 131.3 g of the 1% strength initiator solution are added at 75° C. over the course of 6 hours. The result is a milky dispersion having a pH of 4.8.

pH Table:

| Sample | Time [min] | pH |
|---|---|---|
| 1 | 0 | 10.4 |
| 2 | 60 | 6.0 |
| 3 | 120 | 5.4 |
| 4 | 180 | 5.3 |
| 5 | 240 | 5.2 |
| 6 | 270 | 4.8 |
| 7 | 375 | 4.8 |
| 8 | 480 | 4.8 |

We claim:

1. A process for preparing an aqueous copolymer dispersion by free-radical polymerization of ethylenically unsaturated monomers in an aqueous medium comprising
   (a) from 10 to 90% by weight of at least one hydrophilic monomer A which has and N-vinyl group and whose polymerization rate possesses a maximum at pH level above 7;
   (b) from 10 to 90% y weight of at least one monoethylenically unsaturated hydrophobic monomer B whose polymerization rate possesses a maximum at pH level below 7;
   (c) from 0.01 to 20% by weight, based on the total monomers present in the solution, of at least one water-soluble or water-insoluble free-radical initiator or of a mixture of water-soluble with water-insoluble free-radical initiators.
wherein the pH is controlled in the course of the polymerization reaction in such a way that in the course of the polymerization it decreases by from 2 to 5 units between start and finish of the reaction.

2. A process as claimed in claim 1, wherein the pH decrease in the course of the polymerization reaction is from 2.5 to 4.5 units.

3. A process as claimed in claim 1, wherein the pH at the beginning of the reaction is within the range from 6 to 10.

4. A process as claimed in claim 1, wherein the pH at the end of the reaction lies within the range from 2 to 6.5.

5. A process as claimed in claim 1, wherein the pH reduction is controlled by adding suitable base(s), acid(s) and/or buffer system(s).

6. A process as claimed in claim 5, wherein an acidic polymerization initiator is used as acid (acidic component).

7. A process as claimed in claim 1, wherein the monomer A is selected from N-vinyllactams having 5 to 7 ring atom8; ayclic N-vinylcarboxamides having 2 to 6 carbon atoms; and N-vinylimidazoles and quaternized derivatives thereof.

8. A process as claimed in claim 7, wherein said N-vinyllactam is-vinylpiperidone, N-vinylcaprolactam.

9. A process as claimed in claim 1, wherein the monomer B is selected from esters of monoethylenically unsaturated $C_3$–$C_6$ carboxylic acids; styrene, and vinyl esters of $C_1$–$C_{22}$ carboxylic acids.

10. A process as claimed in claim 1, wherein vinyl acetate is used as monomer B.

11. A process as claimed in claim 1, wherein the starting mixture to be copolymerized further includes from 0.1 to 20% by weight of a further mono ethylenically unsaturated monomer C and/or from 0.1 to 10% by weight of a monomer D which has at least two ethylenically unsaturated bonds.

12. A process as claimed in claim 7, wherein said N-vinyllactam is N-vinylpyrrolidone.

* * * * *

UNITED STATES PATENT AND TRADEMARK OFFICE
CERTIFICATE OF CORRECTION

PATENT NO.    : 6,552,142 B1
DATED         : April 22, 2003
INVENTOR(S)   : Meffert et al.

It is certified that error appears in the above-identified patent and that said Letters Patent is hereby corrected as shown below:

Column 12,
Line 59, "has and N-vinyl" should be -- has an N-vinyl --;
Line 62, "y weight" should be -- by weight --.

Column 13,
Line 21, "atom8" should be -- atoms --.

Column 14,
Line 4, "-vinylpiperidone" should be -- N-vinylpiperidone --.
Line 15, "mono ethylenically" should be -- monoethylenically --.

Signed and Sealed this

Twelfth Day of August, 2003

JAMES E. ROGAN
*Director of the United States Patent and Trademark Office*